June 19, 1934.  A. J. FISCHER  1,963,616
FILTER CAKE THICKNESS CONTROL
Filed May 14, 1931   2 Sheets-Sheet 1
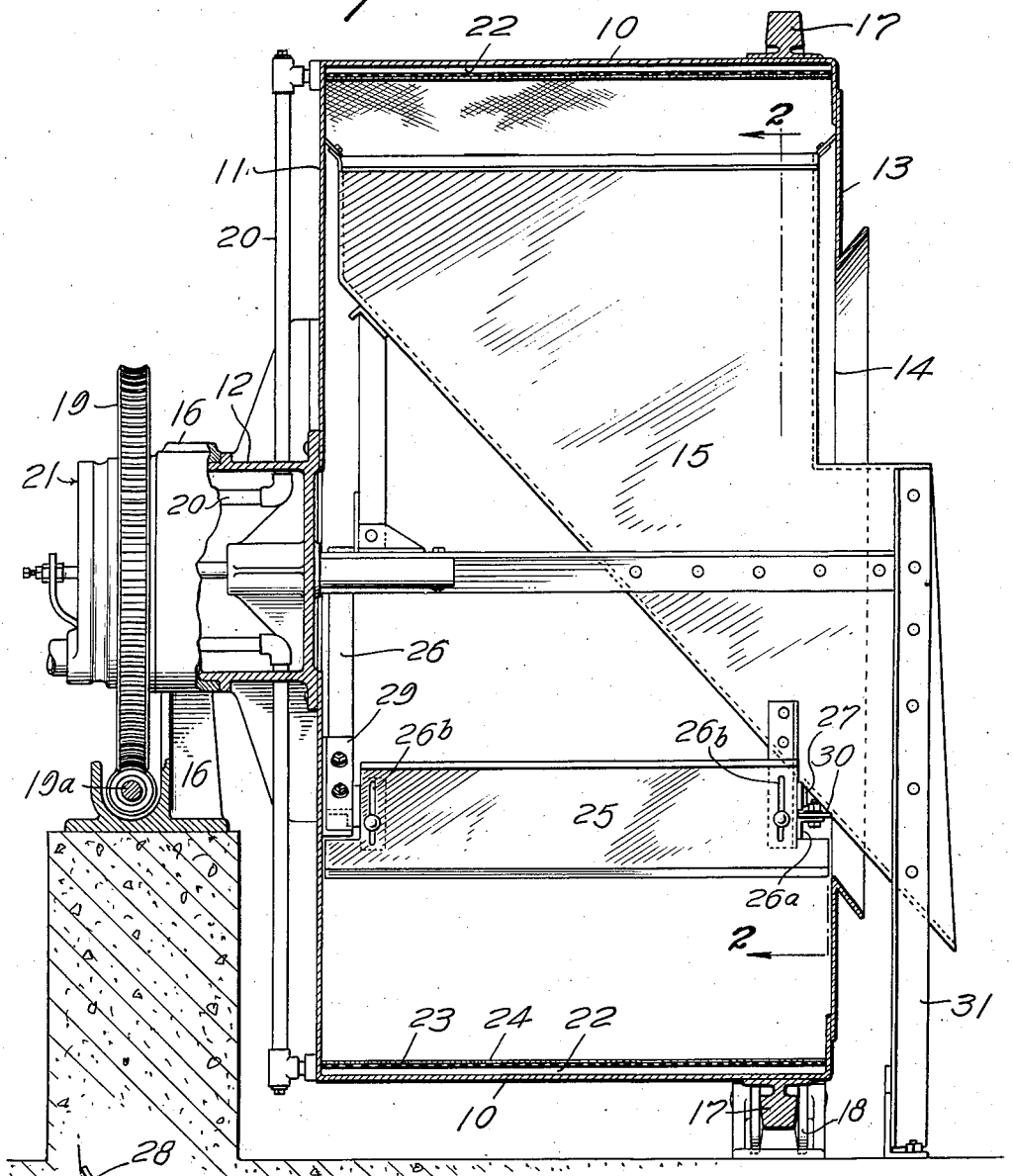
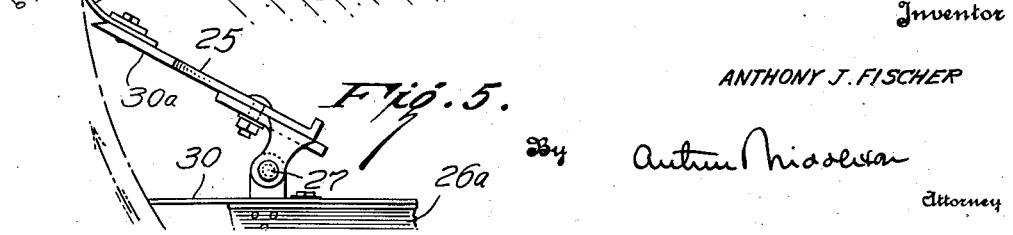
Inventor
ANTHONY J. FISCHER

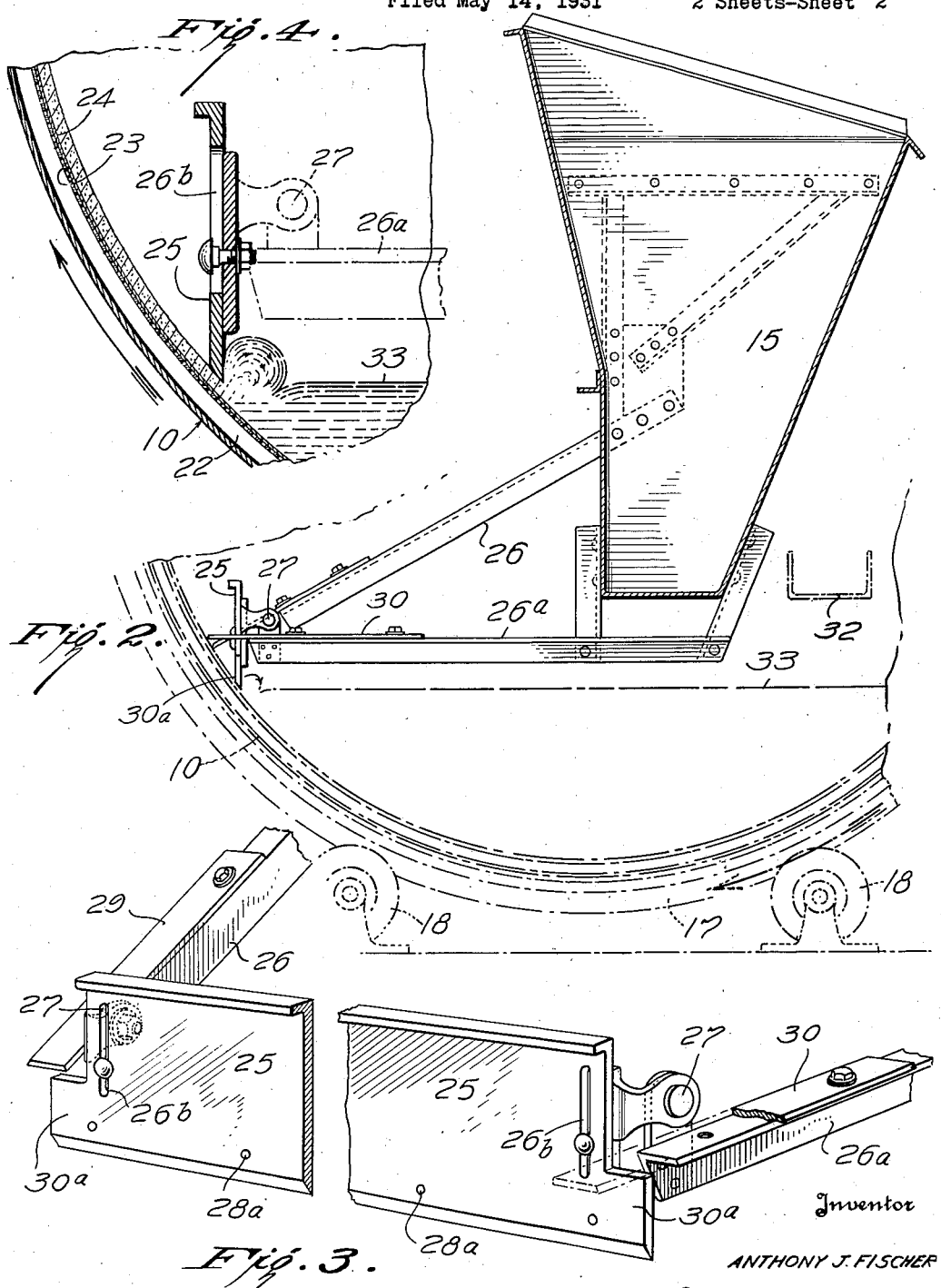

Patented June 19, 1934

1,963,616

UNITED STATES PATENT OFFICE 1,963,616

FILTER CAKE THICKNESS CONTROL

Anthony J. Fischer, Jackson Heights, N. Y., assignor, by mesne assignments, to The Dorr Company, Inc., New York, N. Y., a corporation of Delaware Application May 14, 1931, Serial No. 537,238

2 Claims. (Cl. 210—202)

This invention relates to improvements in continuous filter operation, preferably with thickened sludges of a flocculent or similar nature, such as sewage sludge either digested or activated, paper and other pulps. The type of pulp I have in mind would otherwise not submit satisfactorily to ordinary ways of continuous filtration, but would furnish a product of undesirable character, and insufficient dryness or otherwise, be unfit for commercial use.

I have discovered that many pulps of normally poor filterability can be rendered amenable to the filtering operation if the formation of the cake is positively controlled to a certain thickness which is more or less critical for, and depending upon, the specific character and kind of pulp to be handled. My invention is therefore substantially directed to positively and accurately controlling the thickness of the filter cake formed upon the filter medium of any suitable kind of filter.

More specifically, my object is to control the formation or thickness of the layer of the cake emerging from the filtrant in a filter in a manner which will not alter the porosity or otherwise desirable permeability of the cake, and which will thus prepare the cake for the efficient desiccation in the drying suction zone of the filter.

To be more specific, and without limiting the scope of my invention, I refer to the art of sewage disposal. One problem is to reduce the thickened sewage sludge to a degree of moisture at which it may be readily handled and finally disposed of. The use of continuous filters to reduce the moisture of digested thickened sewage sludge has to my knowledge not been attempted on a commercial scale, due to the difficulties encountered with this material in its filtration and it has been the practice to reduce the sludge to a certain dryness by spreading it over an extensive system of filter beds or the like. So my invention makes possible the economical filtration of thickened sewage sludge in continuous filters.

One feature of my invention relates to a method and means for controlling the thickness of the cake, preferably in a zone substantally where the cake emerges from the pulp bath. At this point of the filter operation, the cake or mass of solids is still in a soft or plastic condition, before it begins to acquire more body and consistency under the effect of further suction in the subsequent drying zone of the filter. An adjustable knife blade or "doctor" or other suitable cake thickness-controlling means mounted in the zone of cake emergence is contemplated by my invention.

With this expedient, it is possible to make the continuous filtration of certain materials economically possible, particularly those which have been thickened to a degree which makes normal filtering difficult.

I have found that pulps of the character described, filter unsatisfactorily unless the thickness of the cake layer on the filter medium in the drying zone is positively and rather accurately controlled to a certain optimum of thickness depending upon the particular kind of material, being treated. I have also found it desirable with such materials to apply the means for the cake-thickness control to a point in the zone of cake emergence, where the mass is still sufficiently plastic to submit readily to the control action, without permitting the doctor or control member to plow up or cause to slough off the entire thickness of the cake layer, or to destroy or alter the characteristic and desirable structure of the cake.

The question of pulp dilution is an important one in the technique of filtration. To explain the importance of my improvement, I have found that thickened pulps of the character described can sometimes be rendered easier to filter by a certain degree of re-dilution. This of course is equivalent to lowered efficiency and reduced filter capacity. With my invention a thicker pulp can be readily filtered, and the filter capacity thus increased.

The preferred embodiment of my invention is shown in connection with continuous rotary drum-filters, and more particularly the drawings show a practical arrangement in the internal drum type, which provides a knife blade or other suitable equivalent, supported preferably for universal adjustment such as for radial as well as longitudinal adjustment, for more effectively controlling the cake thickness. The semi-liquid or plastic mass passing under the blade as it emerges is thereby scraped or trimmed to the proper thickness while entering the drying zone. The drying zone in the internal drum filter is limited between the point of emergence and the cake discharge zone at the top of the drum, and with a novel attachment of the character described it is possible to reduce the cake moisture sufficiently within the limits of that zone, to insure ready cake discharge from the top of the drum, and to render it fit for further handling and disposal. With my attachment, it is also possible to coordinate more readily the various operating factors as drum speed, intensity of suction, dilution of the pulp and cake thickness, to the end of greatest efficiency in the operation of continuous filters.

Corresponding to the specific character of the pulp it is of importance to set the thickness controlling blade at the proper angle relative to the surface of the filter cake. One feature therefore provides universal adjustability of the blade. In some cases a blade set at a pointed angle may be required, in others as for instance with a stringy material an obtuse setting would be preferred.

In sewage work in particular it has been found to be advantageous to employ a blade mounted with a flexible strip to form its operating edge so as to cause a rather gentle trimming of the cake surface, or thickness control.

Other features and advantages will appear hereinafter.

In the appended drawings I have shown an embodiment of my invention for the purpose of illustration. In them Fig. 1 is a longitudinal sectional view of a suction drum filter of the internal type.

Fig. 2 is an end view of the novel blade member.

Fig. 3 is an enlarged perspective detail view of the blade member showing its adjustable mounting upon brackets or supporting members.

Fig. 4 is an enlarged detail view showing the action of the blade member and its general location in the zone of pulp emergence in an internal drum filter.

Fig. 5 is a view similar to Fig. 4 showing another embodiment of my invention wherein the blade member has mounted thereon a rubber strip.

Fig. 1 represents a rotary suction drum filter of a preferred standard type having internal filtering sections or so-called panels. It comprises an outer shell 10 closed at one end by the end plate 11 and the trunnion member 12, and having at the other end an annular front plate 13 with a circular opening 14 for the endwise discharge of the filter cake, the cake dropping as usual from the top portions of the filter into a hopper or chute 15 to discharge.

The rear end of the filter drum is formed by the trunnion 12 in a journal 16, the front end of the drum being supported for rotary movement through a circular track member 17 upon the shell, by supporting rollers 18. The trunnion carries a worm gear 19 driven by the worm 19a to rotate the drum. The trunnion houses the customary pressure-suction connections 20 leading to the individual filter sections of the drum, and registers at the end with a standard stationary valve cover 21 through which suction and pressure respectively are distributed to the proper working zones of the filter in a known manner. The filter sections or panels are indicated at 22, with a filter backing 23 and the filter medium 24.

A novel blade or cake trimming doctor 25 may be carried by a supporting structure comprising the arms 26 and 26a suspended in a convenient manner through braces from the discharge chute 15. The general location of the trimming member or doctor is substantially in the zone of cake emergence. (See Figs. 4 and 5.) By means of slot connections 26b and swivel connections 27 the blade member 25 may be universally adjusted with respect to its operative angle relative to the surface of the cake. Fig. 4 shows one extreme position of blade adjustment with the blade set at a pointed angle relative to the cake surface, thus presenting a pronounced cutting action, whereas Fig. 5 shows the other extreme position with the blade set at an obtuse angle relative to the cake surface, and exerting a more gentle mode of trimming the cake, such as is beneficial with certain fibrous types of pulp. Fig. 5 moreover shows the blade trimmed with a rubber or flexible strip 28 to form the active edge of the blade member, such as I have used with advantage when filtering digested sewage sludge. The blade member shown in Fig. 3 has indicated thereon holes 28a so that with the aid of bolts a rubber strip or the like may be mounted upon the blade member, whenever such be required.

The numerals 29 and 30 indicate flat members or shell wipers mounted on the supporting arms 26 and 26a, and serving to keep the endplates of the drum free from adhering pulp.

The shell wipers are required in order to prevent encrustation of the endplates, and in the present novel structure the supporting members which are otherwise required for such wipers will now also conveniently serve to support the novel doctor blades. In the assembly of the doctor blade and the wipers as shown in Fig. 3 it is noted that the ends of the blade are formed with projections 30a so as to clear the wipers 29, 30, the blade as well as the wipers extending correctly into the end corners of the drum.

The opening 14 in the annular front plate 13 is dimensioned to allow for the unobstructed passage of the hopper or chute 15 which latter must be provided with a slope for causing the proper gravitational discharge of the filter cake. Legs 31 are to support the discharge end of the chute 15. The opening 14 also determines the maximum depth of the pulp bath in the drum.

The pulp is fed into the interior of the drum as by a distributing launder indicated at 32 in Fig. 2, and the operation is such as to maintain substantially a steady pulp level indicated by dot and dash line 33.

The operation of the arrangement is as follows:

A pulp, for instance sewage sludge, is continuously fed into the interior of the drum through the feed trough or launder 32, to maintain a relatively constant pulp level 33 in the drum as the filter operates. The filter drum meanwhile is rotated at a suitable rate of speed while suction on the individual longitudinal panels, which make up the filter area, is controlled from the master valve so as to withdraw liquid from the pulp as the panels submerge into the pulp. On its passage through the pulp zone a thickened layer of sludge forms on each filter panel which emerges from the pulp as a rather wet and plastic cake held by suction to the filter panel or medium. On its travel upward the cake is further dewatered through continued suction until it reaches the discharge zone above the hopper 15 where the suction is released and the cake dropped into the hopper. The operating zone between the zone of cake emergence and cake discharge is the drying zone, and it is important for satisfactory filter operation that in this zone the cake be dried to a degree which is desired for ready discharge and handling of the cake.

It is very difficult if not impossible with certain pulps, as for instance digested sewage sludge, to remove the necessary amount of moisture, within the allotted drying zone. According to this invention and to the end of obtaining a filter product which may be readily handled, the cake must be trimmed down to a certain or critical thickness at which it will allow the filter to dry the cake satisfactorily while passing through said drying suction zone beyond the point of emergence. In the case of digested sewage sludge, the critical thickness for the cake has been found to be 1/8 of an inch, that is to say, with such adjustment the filter could be operated without difficulty on a commercial scale furnishing a filter product sufficiently dry for further handling. The thickness controlling blade member or doctor should be set at the proper angle and for the proper thickness of the cake, according to the individual characteristics and requirements of the particular pulp under treatment.

The blade member is preferably arranged substantially in the zone of emergence of the cake from the pulp, where the cake is in a semi-soft or plastic condition, and where it may be trimmed without compressing or otherwise changing the original structure of the cake. The cake should be left as permeable and porous as possible for efficient dewatering. With fibrous pulps the blade member is preferably adjusted to an obtuse angle relative to the cake surface in order to prevent undue sloughing off of portions of the cake.

As the capacity of the filter and uninterrupted operation depends on the proper cooperation of the various operating zones, it will be seen that an increase of efficiency is obtained through a mechanical attachment such as described.

It will be understood that whereas I have shown and described certain embodiments of my invention for the purpose of illustration, obviously many modifications and alternatives are possible without departing from the spirit and scope thereof as set forth in the appended claims. Also while I consider my improved filter particularly applicable to the treatment of digested sewage sludge, it is useful in connection with other sludges or pulps. Similarly, my invention is applicable to external type rotary drum filters, even though I have only shown it applied to one of the internal type.

I claim:

1. The method of filtration which consists in forming a filter cake through the combined effect of suction and sedimentation upon an endless filter element which travels continuously through a bath of filtrant and emerges with cake resting thereon, and treating said cake to control its thickness in the zone of emergence by peeling back the excess cake into the bath.

2. In a continuous rotary filter having a drum, filter elements thereon adapted to be submerged in a bath of filtrant, means for producing a suction upon said elements whereby filter cake is formed thereon during submergence thereof, a doctor member for controlling the thickness of said cake on said elements, end supports for said doctor member, and wiping members mounted upon said supports to prevent encrustations of the end plates of the drum.

ANTHONY J. FISCHER.